(12) United States Patent
Ward

(10) Patent No.: US 7,785,699 B1
(45) Date of Patent: Aug. 31, 2010

(54) ELECTROSTATICALLY CHARGED POROUS WATER-IMPERMEABLE ABSORBENT LAMINATE FOR PROTECTING WORK SURFACES FROM CONTAMINATION

(76) Inventor: Calvin B. Ward, 9580 Crow Canyon Rd., Castro Valley, CA (US) 94552

( * ) Notice: Subject to any disclaimer, the term of this patent is extended or adjusted under 35 U.S.C. 154(b) by 2274 days.

(21) Appl. No.: 09/655,987

(22) Filed: Sep. 6, 2000

(51) Int. Cl.
B41M 5/00 (2006.01)

(52) U.S. Cl. .......... 428/195.1; 428/904.4; 428/913.3; 428/220; 428/129; 428/315.9; 428/304.4; 428/308.8; 428/311.11; 428/311.51; 428/311.71; 428/320.2; 428/188; 428/381; 428/327; 428/370; 239/44; 239/45; 239/53; 239/56; 239/145; 239/326; 222/187; 604/358; 604/374; 604/1; 57/402; 442/370; 442/381; 264/41

(58) Field of Classification Search .......... 428/304.4, 428/308.8, 311.51, 311.11, 311.71, 320.2, 428/188, 327, 195.1, 195, 315.9; 604/1, 604/358, 374; 264/41; 442/234, 370, 381; 426/129; 57/402; 239/44, 45, 53, 56, 145; 239/326; 222/187
See application file for complete search history.

(56) References Cited

U.S. PATENT DOCUMENTS

| | | | | |
|---|---|---|---|---|
| 3,342,613 A | * | 9/1967 | Schelhorn | 156/291 |
| 3,409,199 A | * | 11/1968 | Lake | 229/407 |
| 3,709,221 A | * | 1/1973 | Riely | 602/43 |
| 3,838,692 A | * | 10/1974 | Levesque | 604/382 |
| 4,312,907 A | * | 1/1982 | Hiraoka et al. | 428/212 |
| 4,411,928 A | * | 10/1983 | Baldwin | 427/2.3 |
| 4,536,433 A | * | 8/1985 | Sagi et al. | 428/195.1 |
| 4,591,513 A | * | 5/1986 | Suzuki et al. | 427/200 |
| 4,613,544 A | * | 9/1986 | Burleigh | 428/315.5 |
| 4,618,475 A | * | 10/1986 | Wang | 422/56 |
| 4,664,971 A | * | 5/1987 | Soens | 428/372 |
| 4,797,310 A | * | 1/1989 | Barby et al. | 428/71 |
| 4,828,542 A | * | 5/1989 | Hermann | 604/3 |
| 4,850,991 A | * | 7/1989 | Nakanishi et al. | 604/387 |
| 4,992,121 A | * | 2/1991 | Rubino | 156/71 |
| 5,102,711 A | * | 4/1992 | Keller et al. | 428/71 |

(Continued)

FOREIGN PATENT DOCUMENTS

WO    WO9812126    *    3/1998

(Continued)

*Primary Examiner*—Mark Ruthkosky
*Assistant Examiner*—Tamra L Dicus
(74) *Attorney, Agent, or Firm*—Calvin Ward

(57) ABSTRACT

A protective covering constructed from an electrostatically charged sheet having a top and bottom surface and an absorbent layer. The absorbent layer has top and bottom surfaces, the bottom surface of the absorbent layer being bonded to the top surface of the electrostatically charged sheet. The absorbent layer is divided into a plurality of cells for containing liquid spilled on the absorbent layer. The absorbent layer can be constructed from paper, open cell foam, fibrous mat, or any other absorbent material. In the preferred embodiment of the present invention, the cells are constructed by providing hydrophobic barriers in the absorbent layer. The barriers can be constructed from paraffin, plastic, or any other material that can penetrate the absorbent layer. In one embodiment of the present invention, a hydrophobic layer is bonded to the top surface of the absorbent layer. The hydrophobic layer has a plurality of pores that allow liquid spilled on the hydrophobic layer to penetrate the hydrophobic layer and be absorbed by the absorbent layer.

16 Claims, 2 Drawing Sheets

U.S. PATENT DOCUMENTS

| | | | | |
|---|---|---|---|---|
| 5,112,677 A | * | 5/1992 | Tani et al. | 442/60 |
| 5,135,787 A | * | 8/1992 | Bair | 428/36.1 |
| 5,486,411 A | * | 1/1996 | Hassenboehler et al. | 442/328 |
| 5,496,627 A | * | 3/1996 | Bagrodia et al. | 442/337 |
| 5,609,587 A | * | 3/1997 | Roe | 604/360 |
| 5,730,922 A | * | 3/1998 | Babb et al. | 264/258 |
| 5,789,076 A | * | 8/1998 | Isohata | 428/315.9 |
| 5,804,512 A | * | 9/1998 | Lickfield et al. | 442/346 |
| 5,807,366 A | * | 9/1998 | Milani | 604/368 |
| 5,817,584 A | * | 10/1998 | Singer et al. | 442/345 |
| 5,830,548 A | * | 11/1998 | Andersen et al. | 428/341 |
| 5,846,604 A | * | 12/1998 | Caldwell | 427/245 |
| 5,855,999 A | * | 1/1999 | McCormack | 604/370 |
| 5,888,604 A | * | 3/1999 | Evans et al. | 428/47 |
| 5,998,308 A | * | 12/1999 | Cohen | 442/110 |
| 6,103,644 A | * | 8/2000 | Sheridan | 442/123 |
| 6,159,325 A | * | 12/2000 | Graham et al. | 156/250 |
| 6,162,961 A | * | 12/2000 | Tanner et al. | 604/374 |
| 6,261,679 B1 | * | 7/2001 | Chen et al. | 428/317.9 |
| 6,376,034 B1 | * | 4/2002 | Brander | 428/35.2 |

FOREIGN PATENT DOCUMENTS

WO        WO 0122858 A1  *  4/2001

* cited by examiner

ELECTROSTATICALLY CHARGED POROUS WATER-IMPERMEABLE ABSORBENT LAMINATE FOR PROTECTING WORK SURFACES FROM CONTAMINATION

FIELD OF THE INVENTION

The present invention relates to electrically charged plastic sheets, and more particularly, to a self-adhering material for protecting surfaces from contamination.

BACKGROUND OF THE INVENTION

In environments in which hazard materials such as organic solvents and radioactive materials are used, workbenches and the like are often covered with an absorbent disposable material to prevent the contamination of the workbench in the event of a spill. Protective materials that consist of an absorbent layer with a plastic backing to prevent liquid from reaching the underlying surface are well known in the art. Such materials are sold in rolls and are cut to the correct size at the laboratory. The material is then secured to the workbench with tape to prevent the material from slipping. After the material has served its purpose, the material is removed by peeling off the tape, and the material is discarded in the appropriate trash container.

This solution to the contamination problem has two problems. First, the time needed to secure the protective material to the workbench is significant and requires the installer to have a large supply of masking tape or the like. Second, if excessive liquid is released on the protective material, the absorbent layer becomes saturated, and the excess liquid can seep off of the sides of the material that are nearest to the saturated portion of the sheet before the operator can contain the spill and replace the protective layer.

Broadly, it is the object of the present invention to provide an improved protective material that can be applied to workbenches and the like.

It is a further object of the present invention to provide a protective material that is self-adhering, and hence, does not require tape or other adhesives.

It is a still further object of the present invention to provide a protective material that is resistant to seepage from the edges.

These and other objects of the present invention will become apparent to those skilled in the art from the following detailed description of the invention and the accompanying drawings.

SUMMARY OF THE INVENTION

The present invention is a protective covering constructed from an electrostatically charged sheet having a top and bottom surface and an absorbent layer. The absorbent layer has top and bottom surfaces, the bottom surface of the absorbent layer being bonded to the top surface of the electrostatically charged sheet. The absorbent layer is divided into a plurality of cells for containing liquid spilled on the absorbent layer. The absorbent layer can be constructed from paper, open cell foam, a fibrous mat, or any other absorbent material. In the preferred embodiment of the present invention, the cells are constructed by providing hydrophobic barriers in the absorbent layer. The barriers can be constructed from paraffin, plastic, or any other material that can penetrate the absorbent layer. In one embodiment of the present invention, a hydrophobic layer is bonded to the top surface of the absorbent layer. The hydrophobic layer has a plurality of pores that allow liquid spilled on the hydrophobic layer to penetrate the hydrophobic layer and be absorbed by the absorbent layer.

DETAILED DESCRIPTION OF THE INVENTION

Figure 1:
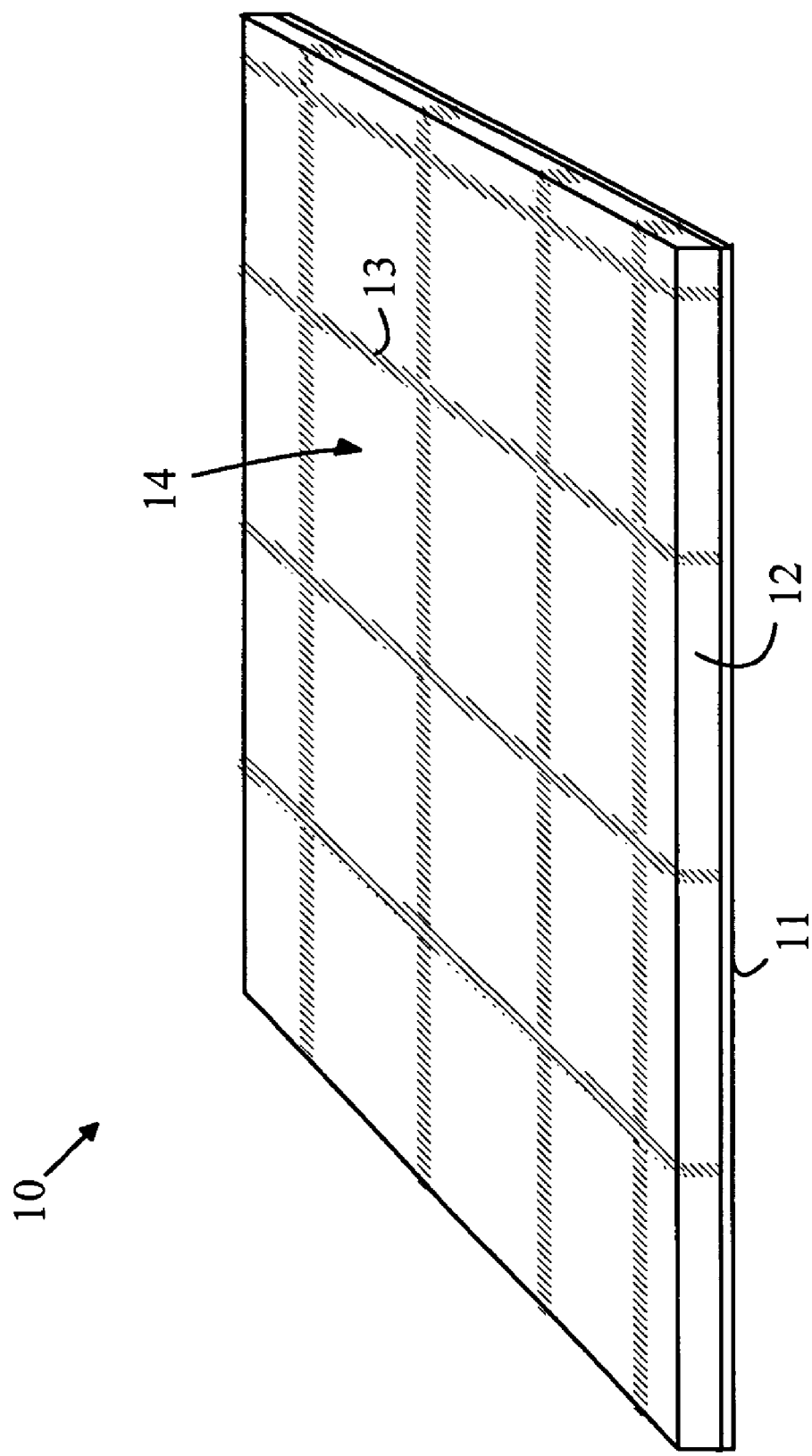
FIG. 1 is a prospective view of a portion of a protective sheet 10 according to the present invention.

The present invention may be more easily understood with reference to FIG. 1, which is a prospective view of a portion of a protective sheet 10 according to the present invention. The present invention utilizes a sheet 11 of electrically charged material that is bonded to a layer 12 of absorbent material. The electrically charged material is preferably a plastic that acts both as a moisture barrier and a means for securing the protective sheet to the work bench through electrostatic adhesion. The layer of absorbent material is preferably divided into cells 14 by impregnating the material with a barrier material 13 in an appropriate pattern. The barriers prevent liquid trapped in a cell from seeping out of the cell, and hence, solve one of the problems discussed above.

The barriers can be constructed from any hydrophobic material that can be introduced into the absorbent material. For example, paraffin can be applied at an elevated temperature to introduce wax barriers. Similarly, varnish or other hydrophobic material can be introduced in an appropriate solvent which is then evaporated.

The electrostatically charged sheet is preferably a plastic such as a polyester, polycarbonate, or polypropylene. Plastic sheets of these materials can be charged by placing the sheets in an electric field, which is typically 10,000 volts/cm. Methods for charging such sheets are well known to the art, and hence, will not be discussed in detail here. The sheets may be heated during the charging process to increase the remnant electric field. In the preferred embodiment of the present invention, a polyester film having a thickness between 0.001 inches and 0.01 inches is passed between rollers and subjected to an electric field and corona discharge to charge the film. This film is then attached to the absorbent layer. However, embodiments in which the film is attached to the absorbent layer before being subjected to the electric field and corona discharge can also be practiced.

The absorbent layer is preferably constructed from paper that has been impregnated with a hydrophobic material such as paraffin. When placed in contact with the plastic sheet, the stripped paper can be attached by applying an adhesive or by heating the two layers while pressing the layers together such that the hydrophobic material melts and acts as an adhesive. The thickness of the paper will depend on the anticipated liquid loading and the absorbency of the paper. Paper compositions such as used in paper towels are suitable for most applications.

The absorbent layer can also be constructed from an open cell foam material or other absorbent material. For example, thin sheets of plastic foam with an open cell structure can be used to provide a high-absorbency material. The plastic foams that can also be charged electrically can also be advantageously utilized. Such foams will retain material electrostatically after the solution in which the material was dissolved has evaporated from the absorbent layer, and thus, prevent the remaining material from being lost as "dust".

Similarly, the absorbent layer can be constructed from a fibrous mat such as used in air filters. If the fibers are formed from a plastic that can be charged, the mat can also be charged. Such electrostatically charged mats are well known in the air filter arts, and hence, will not be discussed further here.

Figure 2:
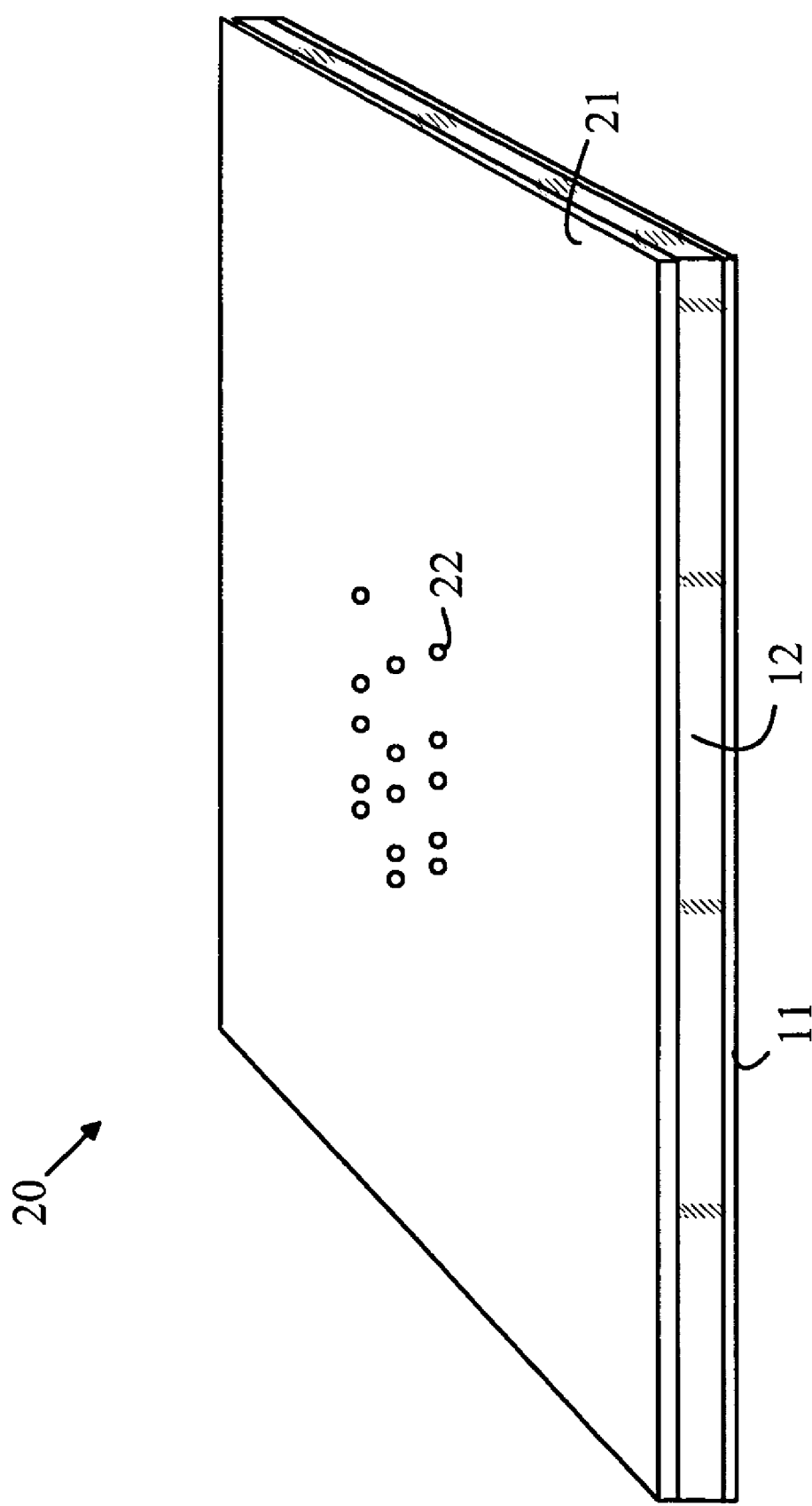
FIG. 2 is a perspective view of another embodiment 20 of the present invention in which the absorbent layer may be covered with a hydrophobic plastic layer that includes pores.

Refer now to FIG. 2, which is a perspective view of another embodiment 20 of the present invention in which the absorbent layer may be covered with a hydrophobic plastic layer 21 that includes pores 22. The pores allow a liquid spilled on layer 21 to pass through to the absorbent material while leaving the surface of the protective sheet dry. Materials such as those used in disposable diapers may be utilized for the top layer.

Various modifications to the present invention will become apparent to those skilled in the art from the foregoing description and accompanying drawings. Accordingly, the present invention is to be limited solely by the scope of the following claims.

What is claimed is:

1. A protective covering comprising:
   a water-impermeable electrostatically charged sheet having a top and bottom surface; and
   an absorbent layer having top and bottom surfaces, said bottom surface of said absorbent layer being bonded to said top surface of said electrostatically charged sheet, said absorbent layer being divided into a plurality of cells for containing liquid within the boundaries of said cells, said liquid being prevented from moving between said cells.

2. The protective covering of claim 1, wherein said absorbent layer comprises paper.

3. The protective covering of claim 1, wherein said absorbent layer comprises an open cell foam.

4. The protective covering of claim 3, wherein said foam is electrostatically charged.

5. The protective covering of claim 1, wherein said absorbent layer comprises a fibrous mat.

6. The protective covering of claim 5, wherein said fibrous mat is electrostatically charged.

7. The protective covering of claim 1, wherein said absorbent layer comprises a plurality of hydrophobic barriers, said hydrophobic barriers defining said cells.

8. The protective covering of claim 1 further comprising a hydrophobic layer bonded to said top surface of said absorbent layer, said hydrophobic layer having a plurality of pores therethrough, said pores allowing liquid to penetrate said hydrophobic layer and be absorbed by said absorbent layer.

9. A protective covering for protecting an exposed surface:
   a water-impermeable electrostatically charged sheet having a top and bottom surface; and
   an absorbent layer having top and bottom surfaces, said bottom surface of said absorbent layer being in contact with said top surface of said electrostatically charged sheet,
   wherein said absorbent layer comprises an open cell foam.

10. The protective covering of claim 9, wherein said foam is electrostatically charged.

11. A protective covering for protecting an exposed surface:
    a water-impermeable electrostatically charged sheet having a top and bottom surface; and
    an absorbent layer having top and bottom surfaces, said bottom surface of said absorbent layer being in contact with said top surface of said electrostatically charged sheet, wherein said absorbent layer comprises a fibrous mat.

12. The protective covering of claim 11, wherein said fibrous mat is electrostatically charged.

13. A protective covering for protecting an exposed surface:
    a water-impermeable electrostatically charged sheet having a top and bottom surface; and
    an absorbent layer having top and bottom surfaces, said bottom surface of said absorbent layer being in contact with said top surface of said electrostatically charged sheet, wherein said absorbent layer comprises a plurality of hydrophobic barriers, said hydrophobic barriers defining a plurality of cells for containing liquid within the boundaries of said cells, said liquid being prevented from moving between said cells by said barriers.

14. A protective covering for protecting an exposed surface:
    a water-impermeable electrostatically charged sheet having a top and bottom surface; and
    an absorbent layer having top and bottom surfaces, said bottom surface of said absorbent layer being in contact with said top surface of said electrostatically charged sheet, wherein said absorbent layer further comprises a hydrophobic layer bonded to said top surface of said absorbent layer, said hydrophobic layer having a plurality of pores therethrough, said pores allowing liquid to penetrate said hydrophobic layer and be absorbed by said absorbent layer.

15. A protective covering for protecting an exposed surface:
    a water-impermeable electrostatically charged sheet having a top and bottom surface; and
    an absorbent layer having top and bottom surfaces, said bottom surface of said absorbent layer being in contact with said top surface of said electrostatically charged sheet, wherein said electrostatically charged layer is bonded to said absorbent layer.

16. A protective covering for protecting an exposed surface:
    a water-impermeable electrostatically charged sheet having a top and bottom surface; and
    an absorbent layer having top and bottom surfaces, said bottom surface of said absorbent layer being in contact with said top surface of said electrostatically charged sheet, wherein said absorbent layer is divided into a plurality of cells for containing liquid by liquid impermeable barriers that prevent liquid from moving from one cell to another.

* * * * *